(12) United States Patent
Liu et al.

(10) Patent No.: US 11,516,010 B2
(45) Date of Patent: Nov. 29, 2022

(54) SYSTEM AND METHOD TO SECURELY BROADCAST A MESSAGE TO ACCELERATORS USING VIRTUAL CHANNELS

(71) Applicants: Baidu USA LLC, Sunnyvale, CA (US); KUNLUNXIN TECHNOLOGY (BEIJING) COMPANY LIMITED, Beijing (CN)

(72) Inventors: Yong Liu, Sunnyvale, CA (US); Yueqiang Cheng, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 284 days.

(21) Appl. No.: 16/709,240

(22) Filed: Dec. 10, 2019

(65) Prior Publication Data

US 2021/0173724 A1 Jun. 10, 2021

(51) Int. Cl.
| | | |
|---|---|---|
| H04L 9/14 | (2006.01) | |
| H04L 9/08 | (2006.01) | |
| H04L 9/00 | (2022.01) | |
| H04L 9/30 | (2006.01) | |
| G06F 9/54 | (2006.01) | |

(52) U.S. Cl.
CPC ............... *H04L 9/14* (2013.01); *G06F 9/546* (2013.01); *H04L 9/006* (2013.01); *H04L 9/0825* (2013.01); *H04L 9/30* (2013.01)

(58) Field of Classification Search
CPC ........................................................ H01L 9/14
See application file for complete search history.

(56) References Cited

U.S. PATENT DOCUMENTS

| | | |
|---|---|---|
| 642,945 A | 2/1900 | Wright |
| 6,426,945 B1 | 7/2002 | Sengodan |
| | (Continued) | |

OTHER PUBLICATIONS

Kurzak, J. et al.; Design and Implementation of the PULSAR Programming System for Large Scale Computing [online]; 2017 [retrieved on Feb. 7, 2022]; Supercomputing Frontiers and Innovations; (Year: 2017).*

(Continued)

*Primary Examiner* — Bradley W Holder
(74) *Attorney, Agent, or Firm* — Womble Bond Dickinson (US) LLP

(57) ABSTRACT

Embodiments disclosed systems and methods to broadcast a message to one or more virtual data processing (DP) accelerators. In response to receiving a broadcast instruction from an application, the broadcast instruction designating one or more virtual DP accelerators of a plurality of virtual DP accelerators to receive a broadcast message, the system encrypts the broadcast message based on a broadcast session key for a broadcast communication session. The system determines one or more public keys of one or more security key pairs each associated with one of the designated virtual DP accelerators. The system encrypts the broadcast session key based on the determined one or more public keys. The system broadcasts the encrypted broadcast message, and the one or more encrypted broadcast session keys to adjacent virtual DP accelerators for propagation.

21 Claims, 13 Drawing Sheets

(56) References Cited

U.S. PATENT DOCUMENTS

| | | | |
|---|---|---|---|
| 6,553,009 B2* | 4/2003 | Artzi | H04B 7/18595 370/316 |
| 6,912,655 B1* | 6/2005 | Zucker | H04L 9/321 380/281 |
| 8,477,941 B1 | 7/2013 | Dhanoa et al. | |
| 10,813,001 B1 | 10/2020 | Ibarra | |
| 2004/0143645 A1 | 7/2004 | Cheenath | |
| 2006/0161502 A1* | 7/2006 | Cerruti | G06Q 20/3829 705/71 |
| 2006/0248142 A1 | 11/2006 | Ishizaki et al. | |
| 2011/0072270 A1 | 3/2011 | Little et al. | |
| 2014/0280627 A1* | 9/2014 | Ross | H04L 12/18 709/206 |
| 2015/0195264 A1 | 7/2015 | Finlayson | |
| 2016/0044001 A1 | 2/2016 | Pogorelik | |
| 2018/0225237 A1 | 8/2018 | Edirisooriya et al. | |
| 2018/0343258 A1 | 11/2018 | Spies et al. | |
| 2019/0140979 A1 | 5/2019 | Levi et al. | |
| 2019/0230094 A1 | 7/2019 | Pietea et al. | |
| 2020/0073734 A1 | 3/2020 | Wang | |
| 2020/0323024 A1 | 10/2020 | Huang et al. | |
| 2020/0389322 A1 | 12/2020 | Selander et al. | |
| 2021/0176632 A1 | 6/2021 | Liu | |

OTHER PUBLICATIONS

Continuation of U: Retrieved from the internet: <URL:https://www.research.manchester.ac.uk/portal/en/publications/design-and-implementation-of-the-pulsar-programming-system-for-large-scale-computing(4e594e04-2024-4614-a314-92e5eac92dfb).html (Year: 2017).*

Han, Sangjin, et al., "PacketShader: A GPU-Accelerated Software Router," Department of Electrical Engineering, KAIST, Korea, published 2010.

* cited by examiner

FIG. 5

HOST_104 ADJACENCY TABLE 500

| VID 501 | Port 502 | Virt. Chnl 503 | Session Key 504 | Context Info. 505 |
|---|---|---|---|---|
| VDPA_105A_ID | 0 | 0.0 | 0x4597A4D5... | Host_Proc_ID, VDPA_Proc_ID, Status, User_ID... |
| VDPA_105B_ID | 0 | 0.1 | 0x12F7B475... | ... |
| VDPA_105C_ID | 0 | 0.2 | 0x99B5C25D... | ... |
| VDPA_105D_ID | 0 | 0.3 | 0x39EAFD11... | ... |
| VDPA_106A_ID | 1 | 1.0 | 0x51BF2318... | ... |
| VDPA_106B_ID | 1 | 1.1 | 0x6623FD78... | ... |
| VDPA_106C_ID | 1 | 1.2 | 0x2FE3D461... | ... |
| VDPA_106D_ID | 1 | 1.3 | 0x7EB429CA... | ... |
| VDPA_107A_ID | 2 | 2.0 | 0x44D2C3FB... | ... |
| VDPA_107B_ID | 2 | 2.1 | 0x8A1F7D04... | ... |
| VDPA_107C_ID | 2 | 2.2 | 0xBE129746... | ... |
| VDPA_107D_ID | 2 | 2.3 | 0xA533BD79... | ... |

VDPA_105A ADJACENCY TABLE 510A

| VID 511A | DP105 Port 512A | DP105 Virt. Chnl 513A | Session Key 514A | Context Information 505A |
|---|---|---|---|---|
| HOST_104_ID | 0 | 0.0 | 0x4597A4D5... | Caller=Host_104_ID:Process_ID<br>Caller_Status=Waiting on result from VDPA_105A |
| VDPA_106A | 1 | 1.0 | 0x1E35B2FA... | Caller: VDPA_105A<br>Caller_Status = Waiting on result(s)<br>VDPA_106A Status=executing |
| VDPA_107A | 2 | 2.0 | 0x73828EFA... | Caller: Null<br>VPDA_107A Status=Idle |

VDPA_105B ADJACENCY TABLE 510B

| VID 511B | DP105 Port 512B | DP105 Virt. Chnl 513B | Session Key 514B | Context Information 505B |
|---|---|---|---|---|
| HOST_104_ID | 0 | 0.1 | 0x12F7B475... | ... |
| VDPA_106B | 1 | 1.1 | 0x8E4A7923... | ... |
| VDPA_107B | 2 | 2.1 | 0x41CE8821... | ... |

SYSTEM AND METHOD TO SECURELY BROADCAST A MESSAGE TO ACCELERATORS USING VIRTUAL CHANNELS

TECHNICAL FIELD

Embodiments of the present disclosure relate generally to artificial intelligence model training and inference. More particularly, embodiments of the disclosure relate to a system and method for a broadcast protocol to securely broadcast a message to data processing accelerators using virtual communication channels.

BACKGROUND

Data processing accelerators (DPAs) that are configured to communicate with a host computing device generally cannot communicate securely with each other. Communication, e.g. peer-to-peer communication, between DPAs is useful so that two or more DPAs can cooperate and coordinate to perform a data processing task on behalf of a host computing device. However, it is important that DPAs communicate securely so that the processing task performed by cooperating DPAs is performed securely such that another computing entity may not alter a result produced by the communicating DPAs, and may not steal code or data from any of the communicating DPAs.

BRIEF DESCRIPTION OF THE DRAWINGS

Embodiments of the disclosure are illustrated by way of example and not limitation in the figures of the accompanying drawings in which like references indicate similar elements.

FIG. 5 is a block diagram illustrating secure communications adjacency tables between a host device and a plurality of virtual data processing accelerators, according to an embodiment.

DETAILED DESCRIPTION

Figure 1:
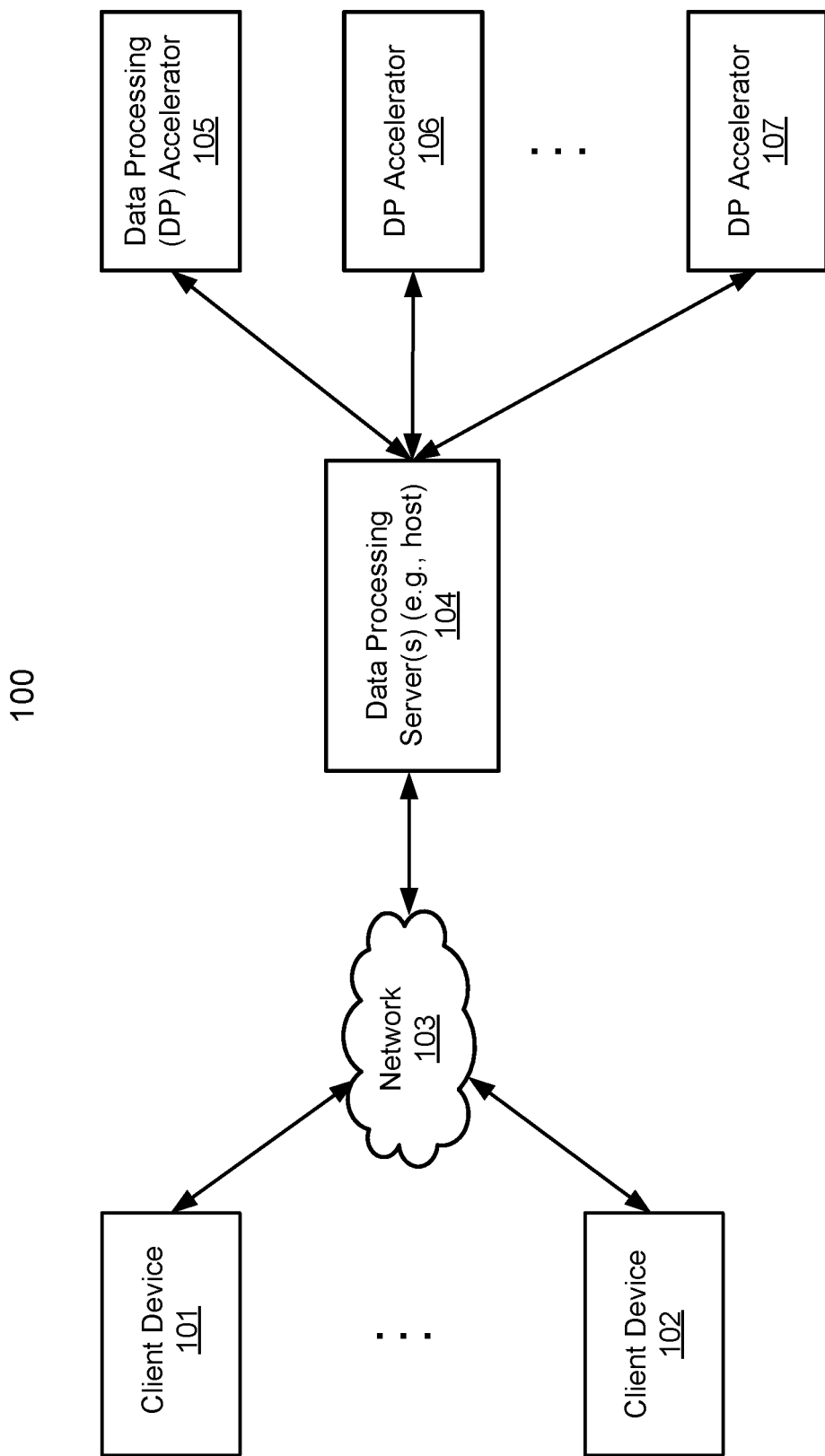
FIG. 1 is a block diagram illustrating a secure processing system, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to one or more DP accelerators. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. A DP accelerator can be configured to include a plurality of virtual DP (VDP) accelerators. Each of the VDP accelerators can communicate with the host via a virtual communication channel. Each of the VDP accelerators can communicate with at least one of the VDP accelerator over a different virtual communication channel. Virtual communication channels are each secured using a different session key for each channel.

The host device and each VDP accelerator can exchange keys and initiate a secure channel over the PCIe bus before performing operations of the aspects of the invention described below. Embodiments are described herein for generating one or more keys for securing communications between a host and a VDP accelerator, and for securing communications between any two VDP accelerators in a plurality of VDP accelerators. In an embodiment, communications between any two VDP accelerators use one or more keys that are unique with respect to any other two VDP accelerators. Some of the operations performed by a VDP accelerator include the VDP accelerator using an artificial intelligence (AI) model to perform inferences using data provided by the host device. Before the AI model inferences are delegated to a VDP accelerator, secure virtual communication channels are established between the host and VDP accelerator and between the VDP accelerator and any other VDP accelerator that may participate in the AI model inference.

Embodiments disclosed systems and methods to broadcast a message to one or more virtual data processing (DP) accelerators. In response to receiving a broadcast instruction from an application, the broadcast instruction designating one or more virtual DP accelerators of a plurality of virtual DP accelerators to receive a broadcast message, the system encrypts the broadcast message based on a broadcast session key for a broadcast communication session. The system determines one or more public keys of one or more security key pairs each associated with one of the designated virtual DP accelerators. The system encrypts the broadcast session key based on the determined one or more public keys. The system broadcasts the encrypted broadcast message, and the one or more encrypted broadcast session keys to adjacent virtual DP accelerators for propagation, where a designated virtual DP accelerator decrypts the encrypted broadcast session key based on a corresponding private key associated with the designated virtual DP accelerator, where the message is decrypted based on the broadcast session key.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107 according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each DP accelerator can be configured as a plurality, e.g. four, virtual DP (VDP) accelerators. Thus, for example, DP accelerator 105 can be configured as four virtual DP accelerators 105A, 105B, 105C, and 105D. Each of the applications may be launched and executed within a trusted execution environment (TEE) specifically configured and executed by a central processing unit (CPU) of host 104. When an application is configured to access any one of the VDP accelerators, e.g. 105A-105D, 106A-106D, or 107A-107D, an obscured connection can be established between host 104 and the corresponding one of the VDP accelerator, such that the data exchanged between host 104 and VDP accelerators is protected against attacks from malware/intrusions.

Figure 2A:
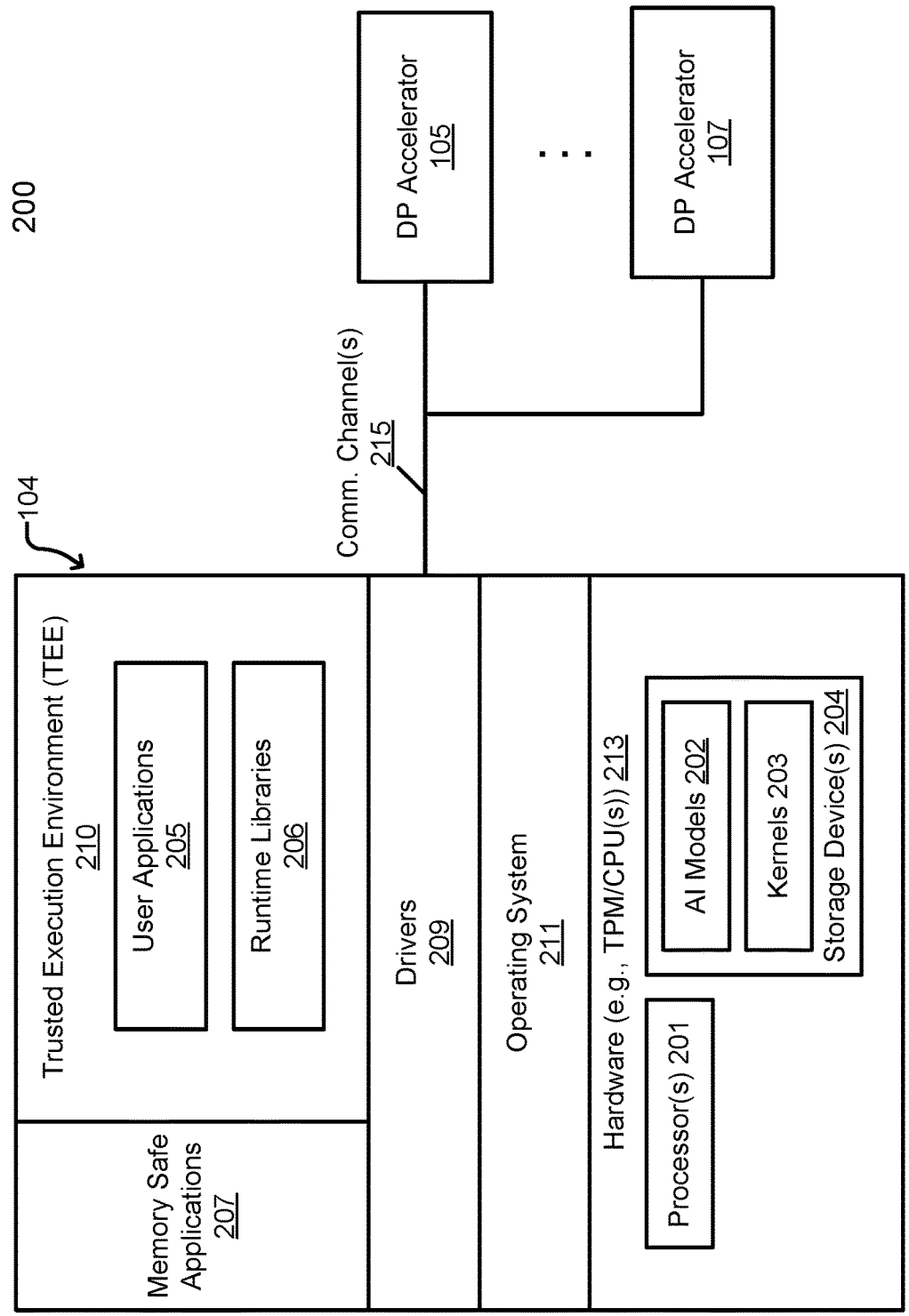
FIGS. 2A and 2B are a block diagrams illustrating a secure computing environment between one or more hosts and one or more virtual data processing accelerators, according to one embodiment.

FIG. 2A is a block diagram illustrating an example of a multi-layer protection solution for obscured communications between a host system 104 and data process (DP) accelerators 105-107 according to some embodiments. In one embodiment, system 200 provides a protection scheme for obscured communications between host 104 and DP accelerators 105-107 with or without hardware modifications to the DP accelerators. Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions. Communication channels 215 can be configured to carry a plurality of virtual channels. For example, host 104 can communicate with DP accelerator 105 over a single physical channel 215 that includes a plurality, e.g. four, virtual communication channels 215A, 215B, 215C, and 215D. In an embodiment, the virtual communication channels 215A-215D can be time-multiplexed over physical channel communication channel 215. Each virtual communication channel can have a different session key for securing communications on the virtual communication channel than the session key of any other virtual communication channel. In an embodiment, messages sent over a virtual communication channel can be sent over a physical communication channel on a queued basis, using any of first-in-first-out, largest-out first, smallest-out first, last-in-first-out, or other queuing logic.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. Each DP accelerator can be configured as a plurality of virtual DP accelerators in accordance with configuration instructions received from host 104. In an embodiment, the configuration instructions can be provided to each DP accelerator at, e.g., boot time, and the configuration is maintained until a next boot sequence of the host 104. In an embodiment, each virtual DP accelerator communications with an adjacent host device 104 or other virtual DP accelerator over a virtual communication channel that is defined by the points (nodes) that are communicating over the virtual communication channel. For example, host 104 may communicate with DP accelerator over a physical communication channel 215 defined by physical port 0 of host 104 to a physical port 0 of DP accelerator 105. Host 104 can instruct DP accelerator 105 to configure itself as four (4) virtual DP accelerators 105A, 105B, 105C, and 105D. Host 104 and DP accelerator 105 can configure themselves to treat communication channel 215 as four virtual channels 215A, 215B, 215C, and 215D. Thus, host 104 communicates with virtual DP accelerator (VDPA) 105A using virtual communication channel 215A. Similarly, host 104 communications with VPDA 105B over virtual communication channel 215B, and similarly for VPDA 105C and 105D communicating over virtual communication channels 215C and 215D. Host 104 can maintain an adjacency table that relates a process running on host 104 with a physical communication port of host 104, a virtual communication port of the physical communication port, a corresponding virtual data processing accelerator, and a session key. In an embodiment, each session key is unique with respect to other session keys for other virtual communication channels.

In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot. The TPM chip can include a secure memory for storing keys that are rooted, e.g. in hardware, and keys that are derived from the rooted keys. In an embodiment, secure storage can include a rooted asymmetric key pair (RK): a public key (PK_RK) and a private key (SK_RK) of the asymmetric rooted key (RK) pair.

The TPM chip also secure driver(s) 209 and operating system (OS) 211 in a working kernel space to communicate with the DP accelerators 105-107. Here, driver 209 is provided by a DP accelerator vendor and can serve as a driver for the user application to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively occupied by the OS 211 and driver 209, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels. Communication channels may be connected to one or more hardware communication ports, accessible by drivers 209, for communicating over communication channels 215 with DP accelerators 105-107. Communication channels 215 may be secured using a session key as described herein. Each communication channel 215 may be secured using a different session key than other communication channels 215. Drivers 209 may include an adjacency table that maps DP accelerators 105-107 each to a hardware communication port, and a session key associated with each hardware communication port.

Host machine 104 can include trusted execution environment (TEE) 210 which is enforced to be secure by TPM/CPU 213. A TEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provides a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 are not necessary, e.g., user application 205 and/or runtime libraries 206 are hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm. Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations. Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model. Systems and methods for sharing keys used for obfuscation are described herein, below.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
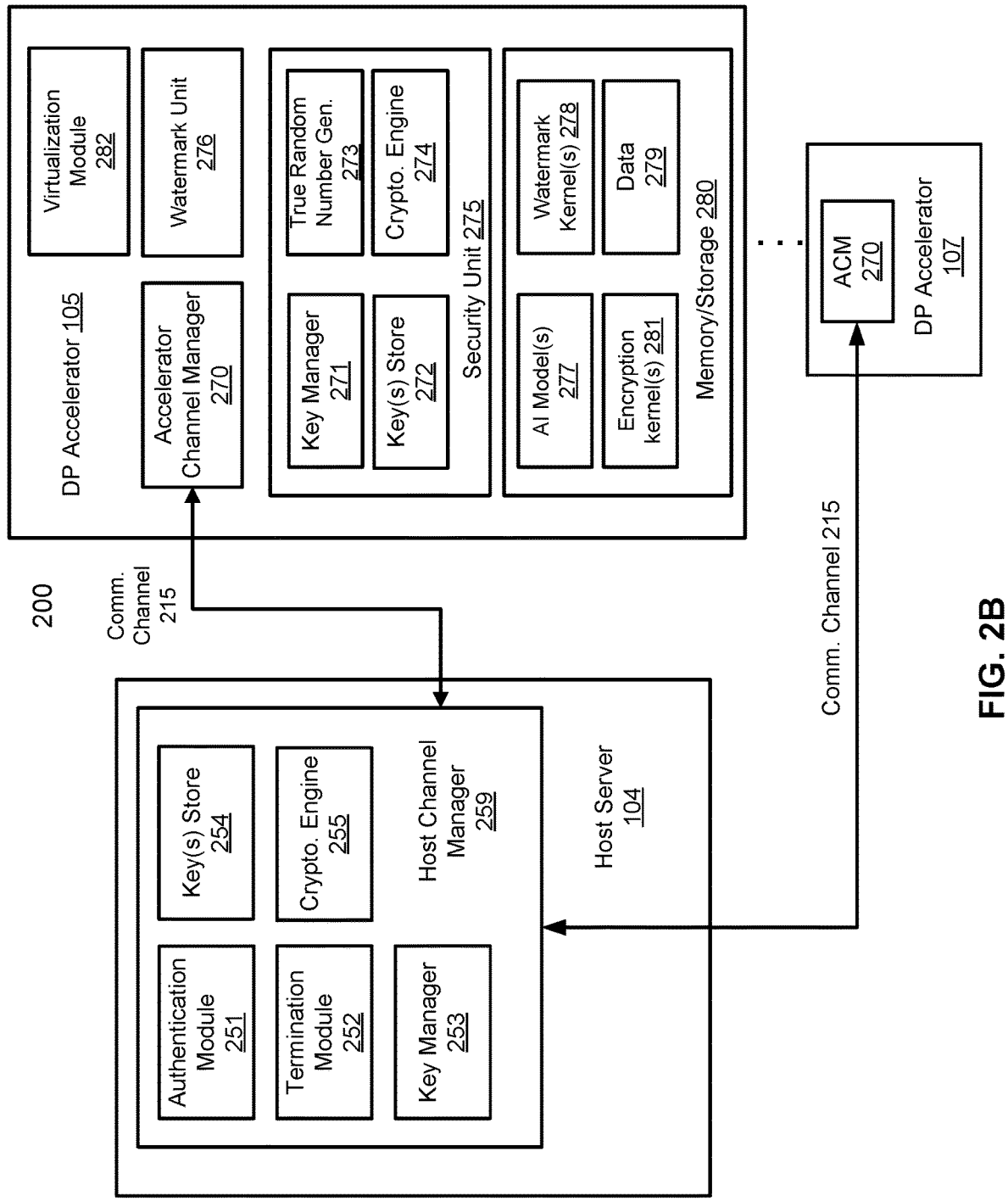

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105-107). Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215.

Figure 3:
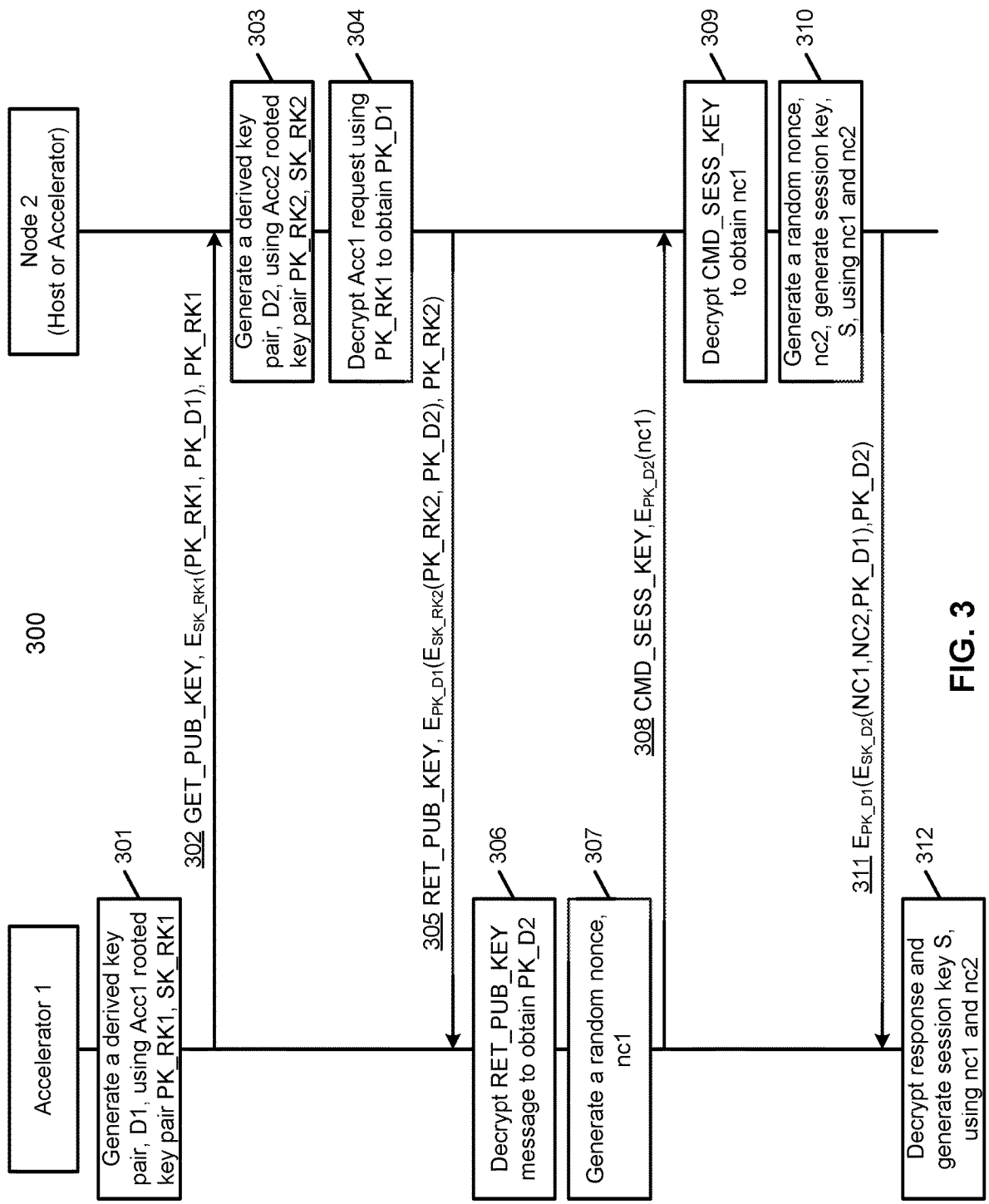
FIG. 3 is a block diagrams illustrating a method of a host and virtual data processing accelerator, or two data processing accelerators, generating a session key for securing communications, according to an embodiment.

FIG. 3 is a block diagrams illustrating a method 300 of a host and a virtual data processing accelerator (VDP accelerator or VDPA), or two virtual data processing accelerators, generating a session key for securing communications, according to an embodiment. Method 300 can be used between a first virtual data processing (VDP) accelerator "Accelerator 1" and a second node, "Node 2." Node 2 can be either a host device or second VDP accelerator. Accelerator 1 has a rooted key pair PK_RK1 and SK_RK1. PK_RK1 is a public key of a rooted asymmetric key pair of Accelerator 1 (RK1). SK_RK1 is a private (secret) key (SK) of rooted asymmetric key pair of Accelerator 1 (RK1). Rooted key pair RK1 is stored in a secured storage of Accelerator 1. Similarly, Node 2 (either a host or another VDP accelerator) has a rooted key pair PK_RK2 and SK_RK2. RK2 can be stored in a secure storage of Node 2.

In operation 301, Accelerator 1 generates a derived asymmetric key pair, PK_D1 and SK_D1, from rooted key pair PK_RK1 and SK_RK1. Deriving an asymmetric key pair is known in the art and will not be described herein.

In operation 302, Accelerator 1 sends to Node 2, a "Get Public Key" command (GET_PUB_KEY) to request a public key of Node 2. The GET_PUB_KEY includes encrypting two of Accelerator 1's public keys: PK_RK1 and PK_D1. In an embodiment, PK_RK1 and PK_D1 can be encrypting using Accelerator 1's private rooted key SK_RK1. The GET_PUB_KEY command further includes Accelerator 1's public rooted key, PK_RK1 in clear-text form. Node 2 can decrypt Accelerator 1's encrypted keys using PK_RK1 and verify that the GET_PUB_KEY request did, in fact, come from Accelerator 1.

In operation 303, Node 2 generates a derived asymmetric key pair PK_D2 and SK_D2 from Node 2's rooted key pair PK_RK2 and SK_RK2. Derived keys PK_D2 and SK_D2 can be stored in secure storage at Node 2.

In operation 304, Node 2 can decrypt the received "GET_PUB_KEY" command from Accelerator 1, using the clear-text public rooted key of Accelerator 1: PK_RK1. Once decrypted, Node 2 obtains Accelerator 1's derived public key: PK_D1.

In operation 305, Node 2 sends to Accelerator 1 a "Return Public Key" (RET_PUB_KEY) message. The message includes Node 2's PK_RK2 and PK_D2, encrypted using Node 2's private rooted key, SK_RK2. Node 2's public rooted key PK_RK2 is packaged with the encrypted keys PK_RK2 and PK_D2, and packaged keys are then encrypted using Accelerator 1's derived public key PK_D1.

In operation 306, Accelerator 1 decrypts the RET_PUB_KEY message using Accelerator 1's private derived key SK_D1. After decryption, Accelerator 1 can obtain Node 2's public rooted key, PK_RK2. Accelerator 1 then decrypts the encrypted keys PK_RK2 and PK_D2 using Node 2's newly-obtained public rooted key, PK_RK2. Accelerator 1 can then obtain Node 2's derived public key, PK_D2. In an embodiment, Accelerator 1 can verify PK_RK2 either, or both, the decrypted PK_RK2 and clear-text PK_RK2 by checking with the host device or a history copy of PK_RK2.

In operation 307, Accelerator 1 can generate a nonce, "nc1."

In operation 308, Accelerator 1 can send a command "Generate Session Key" (CMD_SESS_KEY) to Node 2. The command includes nonce nc1, encrypted using Node 2's public derived key PK_D2. CMD_SESS_KEY instructs Node 2 to generate a session key from Accelerator 1's nonce nc1 and a nonce nc2 that is generated by Node 2.

In operation 309, Node 2 can decrypt nonce nc1 in the received CMD_SESS_KEY using Node 2's private derived key SK_D2.

In operation 310, Node 2 can generate a nonce, nc2. Node 2 can then generate a session key, based on nonces nc1 and nc2. Node 2 stores the session key in an adjacency table of Node 2. The session key is stored in association with Accelerator 1 and a unique identifier of Accelerator 1.

In operation 311, Node 2 can send nonce nc2 to Accelerator 1. Node 2 packages nc1, nc2, and PK_D1 in a first package and encrypts the first package using Node 2's private derived key, SR_D2. Node 2 then adds PK_D2 to the encrypted first package, and generates a second encrypted package that is encrypted using Accelerator 1's public derived key, PK_D1. The encrypted second package is then transmitted to Accelerator 1.

In operation 312, Accelerator 1 receives the encrypted second package from Node 2 and decrypts the second package using Accelerator 1's derived private key, SK_D1. Accelerator 1 can then remove PK_D2 from the decrypted second package, leaving just the encrypted first package. In an embodiment, Accelerator 1 can verify that PK_D2 removed from the decrypted second package matches the PK_D2 previously received in operation 305 and decrypted in operation 306, above. Accelerator 1 can also verify that the nc1 obtained from the decrypted first package, and previously sent to Node 2 in operation 308, has not expired (aka, "verify freshness"). Accelerator 1 can then generate a session key based upon nonces nc1 and nc2. Accelerator 1 can store the generated session key in Accelerator 1's adjacency table, in association with a unique identifier of the Node 2 and the session key.

At this point, both Accelerator 1 and Node 2 have a same session key that was derived from nonces nc1 and nc2 Both Accelerator 1 and Node 2 have stored the session key in their respective adjacency tables. Adjacency tables are described in detail, below, with reference to FIG. 5.

Figure 4:
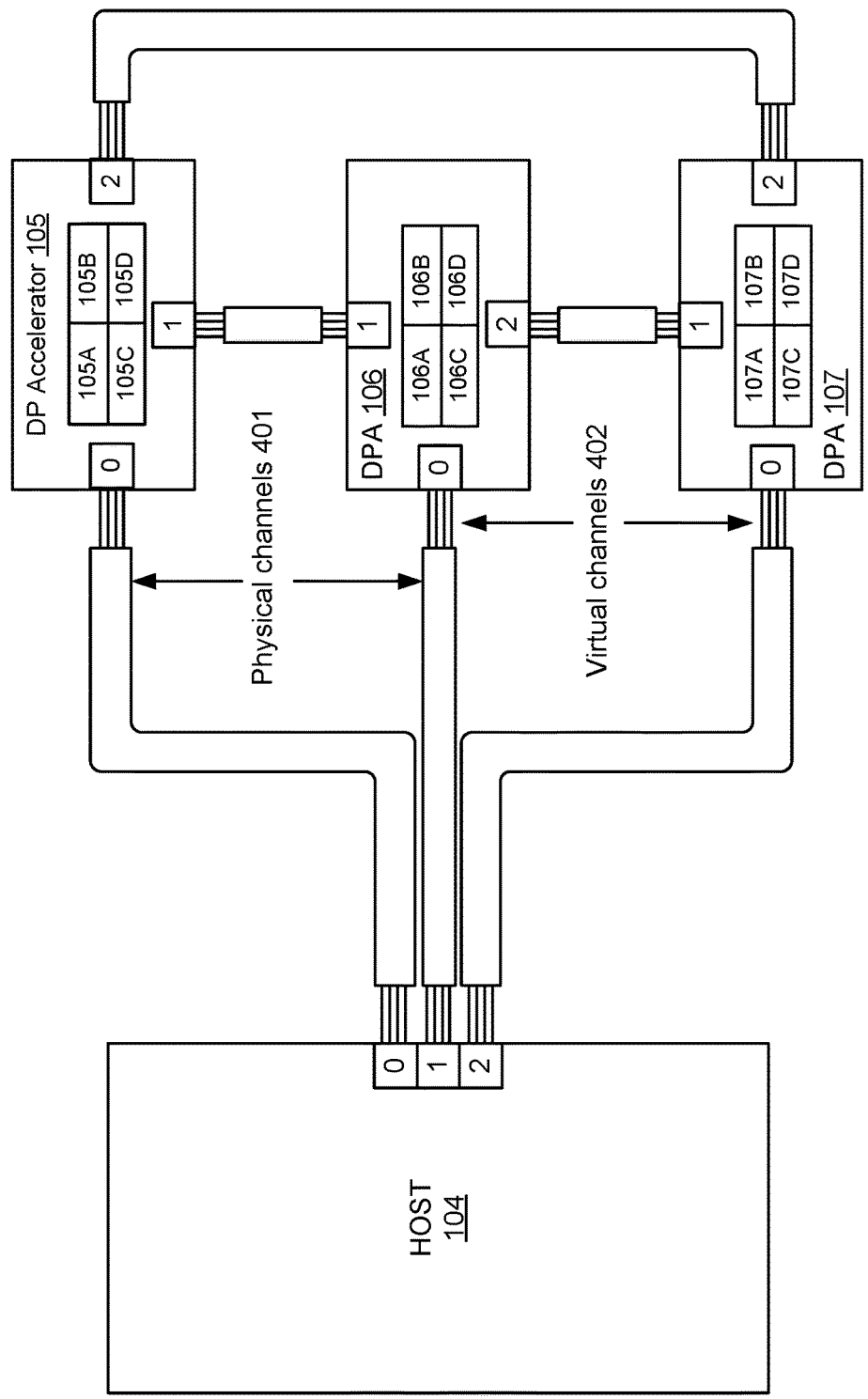
FIG. 4 is a block diagram illustrating a hardware configuration of a host computing device and a plurality of virtual data processing accelerators that securely communicate with one another, according to an embodiment.

FIG. 4 is a block diagram illustrating a hardware configuration 400 of a host computing device 104 and a plurality of data processing (DP) accelerators 105-107. Each DP accelerator, e.g. 105, can be configured as a plurality, e.g. four, virtual data processing (VDP) accelerators 105A-105D. Each VDP accelerator of a DP accelerator can communicate with another VDP accelerator of a different DP accelerator via a virtual communication channel 402. For example, VDP accelerator 105A can be configured to communicate with host 104 and VDP accelerators 106A and 107A. VDP accelerator 105B can be configured to communicate with host 104 and VDP accelerators 106B and 107B. VDP accelerator 105C can be configured to communicate with host 104 and VDP accelerators 106C and 107C. VDP accelerator 106A is also configured to communicate with VDP accelerator 107A. VDP accelerator 106B is also configured to communicate with VDP accelerator. VDP 106C is also configured to communicate with VDP 107C, and VDP 106D is configured to communicate with VDP 107D. These are just example configurations To implement a configuration, each of the host 104 and the DP accelerators can generate one or more adjacency tables that indicate the VDP accelerators configured within a DP accelerator. The VDP accelerators in a DP accelerator can each also have an adjacency table that indicates the other VDP accelerators that each VDP accelerator can communicate with, the virtual communication channel 402 that the VDP accelerators use to communicate, and a session key that is used to secure the communications over the virtual communication channel 402.

Host 104 is communicatively coupled to each of DP accelerator 105, 106, and 107. DP accelerator 105 is communicatively coupled to DP accelerator 106 and 107. Host 104 includes a communication interface having, e.g., ports 0, 1, and 2. In FIG. 4, DP accelerator 105's communication port 0 is communicatively coupled to host 104's communication port 0. DP accelerator 106's communication port 0 is communicatively coupled to host 104's communication port 1. DP accelerator 107's communication port 0 is communicatively coupled to host 104's communication port 2. DP accelerator's 105-107 are also communicatively coupled to each other. DP accelerator 105's communication port 1 is communicatively coupled to DP accelerator 106's communication port 1. DP accelerator 105's communication port 2 is communicatively coupled to DP accelerator 107's communication port 2. DP accelerator 106's communication port 2 is communicatively coupled to DP accelerator 107's communication port 1. Each communicatively coupled pair of physical ports, above, defines a physical communication channel 401. Each physical communication channel 401 can be divided into a plurality of virtual communication channels 402. The number of virtual communication channels 402 per physical channel 401 can be greater than or equal to a number of VDP accelerators for which a DP accelerator is configured. For example, if DP accelerator 105 is configured with four virtual DP accelerators, then communication ports 0, 1, and 2 of DP accelerator 105 can each be configured with four or more virtual communication channels 402, such that there is a virtual communication channel 402 associated with each virtual VDP accelerator 105A-105D of DP accelerator 105. One or more additional virtual communication channels 402 may be configured between host 104 and any of the DP accelerators 105-107, or between any of the DP accelerators 105-107. Such additional virtual communication channels 402 can be used to transmit out-of-band information between host 104 and DP accelerators, or between DP accelerators. In an embodiment, host 104 may communicate with DP accelerator 105 to transmit configuration information to DP accelerator 105, including an instruction that DP accelerator 105 is to configure itself for an identified number of VDP accelerators, each VDP accelerator being assigned to one or more virtual communication channels 402. Each virtual communication channel 402 can have a different session key than any other of the virtual of the virtual communication channels 402. Host 104 similarly instructs the other DP accelerators (106, 107, et al.) to configure themselves, and their VDP accelerators and virtual communications channels, as described above for DP accelerator 105.

Each of the foregoing virtual communication channels 402 can be secured by a different session key than for the other virtual communication channels 402. Thus, if any one of the virtual communication channels 402 is compromised, the other virtual communication channels 402 are still secure. Further, there is redundancy in communication with respect to the host device 104. Each DP accelerator 105-107 can monitor its own physical communication channels 401 to ensure that the each communication channel 401 is operable. Each virtual DP accelerator can also monitor the virtual communication channels 402 to which the virtual DP accelerator is connected, to ensure that each virtual communication channel 402 is operable. If a virtual communication channel 402 fails, the VDP accelerator that detects the failure can notify the DP accelerator in which the VDP accelerator is configured about the failure. The DP accelerator can then notify the host 104 of the failure using one of the additional virtual communications channels 402 that is reserved for out-of-band communications. Out-of-band communications are those communications that are for purposes other than for work-related communications between host 104 and a VDP accelerator, or between two VDP accelerators.

Each of the host 104, and virtual DP accelerator 105A-D, 106A-D, and 107A-D, can have an adjacency table that stores a list of nodes (host or VDP accelerators) that the host 104 or VDP accelerator 105-107 is communicatively coupled to. Adjacency tables are described below with reference to FIG. 5.

FIG. 5 is a block diagram illustrating secure communications adjacency table 500 between and host 104 and a plurality of virtual DP accelerators (VDP accelerators) and an example adjacency table 510A and 510B for two VDP accelerators 105A and 105B, respectively.

As shown in FIG. 4, above, host 104 and DP accelerators 105-107 are communicatively coupled via communication ports on each of the host and DP accelerators. Each DP accelerator can be configured to have a plurality of virtual data processing (VDP) accelerators. VDP accelerators communicate with host 104, and with other VDP accelerators of other DP accelerators via virtual communication channels 402 implemented over physical communication channels 401 between communication ports of the host 104 and DP accelerators.

Host 104, e.g., can have an adjacency table 500 that lists the VDP accelerators that are communicatively coupled to host 104. VDP accelerators, e.g. 105A-105D, 106A-106D and 107A-107D, can each have a unique virtual device ID (VID) 501, e.g. VDP_105A_ID, etc., so that the VDP accelerator can be referred to by name. In an embodiment, when a host wants to send a message to a VDP accelerator, the message can have the format [source, message payload, destination]. Message can be any payload specified by the sender. Example payloads include instructions to a VDP accelerator to configure itself for secure communications with another node (host or VDP accelerator. Payload can include a computational task transmitted from a VDP accelerator to another VDP accelerator. A payload can include the another VDP accelerator sending a result back to the VDP accelerator that assigned the another VDP accelerator a task. Payload can also be any out-of-band communications between host and VDP accelerator or between two VDP accelerators. Out of band communications can be any communication that is not related to performing end-user or application processing work.

Host, as the sender (source) can refer to itself by its own ID 501 e.g. HOST_104_ID. Host 104 can refer to a destination VDP accelerator by its unique VID 501 or by a virtual communication channel identifier 503 of the host, the virtual communication channel identifier being associated with the destination VDP accelerator. The host adjacency table 500 can also include a physical port reference 502. Thus, if host 104 having VID 501 of HOST_104_ID sends a message to VDP accelerator VDPA_106C, the host can look up the VID 501 of VDP accelerator 106A, to determine the virtual channel 503 that is associated with the destination VDPA_106A (here, "1.0" or "the 0$^{th}$ virtual communication channel 402 of the physical port 1 of host 104"). The message can be encrypted using the session key 504 for the host and VDP accelerator 106A (here, "0x51BF2318 . . . " as an example). The host adjacency table 500 can further include context information 505 related to the host and a particular VDP accelerator that is communicatively coupled to the host via a virtual communication channel 402.

Context information can include an identifier of a host process ("Host_Proc_ID") that has called the VDP accelerator to perform work on behalf of the host 104. Context information can further an identifier of a process on the VDP accelerator (e.g. "VDPA_Proc_ID") that is performing the work on behalf of the host 104. Context information can also include a status of the host process, e.g. "waiting on results from VDP accelerator process" and/or a status of the VDP accelerator process that is performing work on behalf of the host 104, e.g. "waiting on VDP accelerator 106B sub-task results," or other status. Context information can further include an identifier of a user (User_ID) associated with the host process. Collectively, the context information can be used to answer a user query at the host, such as "What is the status of the artificial intelligence (AI) model inference that I requested?" Logic on host 104 can query the adjacency table to find context information for the user having a particular User_ID, then determine a status of each VDP accelerator and related process(es) that are performing the AI model inference for the user. Determining such statuses can include out-of-band queries of one or more VDP accelerators to determine whether a particular sub-task of a process has failed at a particular VDP accelerator. Other context information can be generated that can be used to aid in diagnosing performance of one or more processing tasks by one or more VDP accelerators on behalf of a caller, e.g. Host 104, to the one or more VDP accelerators.

In an embodiment, a host delegates work to a single VDP accelerator with instructions to delegate one or more sub-tasks of the work to one or more VDP accelerators. In an embodiment, the single VDP accelerator can determine idle VDP accelerators that can perform the one or more sub-tasks and VDP can determine the particular sub-tasks to delegate the idle VDP accelerators. In an embodiment, host 104 can provide the single VDP accelerator with instructions on which VDP accelerator(s) to delegate the one or more sub-tasks to, and the single VDP accelerator can override the instructions of the host in favor of the single VDP accelerator determining that one or more VDP accelerator are currently idle and available.

Similar to host 104, DP accelerator, e.g. DP accelerator 105, can have a plurality of adjacency tables 510A-510D, one for each of the VDP accelerators 105A-105D of DP accelerator 105. In FIG. 5, example VDP accelerator adjacency tables 510A and 510B are shown for VDP accelerators 105A and 105B. VDP accelerators adjacency tables for any other VDP accelerators (105C, 105D, 106A-106D, and 107A-107D) are similarly derived. The adjacency table 510A for VDP accelerator 105A can include an endpoint virtual ID 511A (e.g. host 104, or adjacent VDP accelerators 106A and 107A), a physical port 512A identifier of a port of the DP accelerator 105 that hosts VDP accelerator 105A, a virtual channel 513A indicating a virtual communication channel 402 with which VDP accelerator 105A communicates with an adjacent node 511A (host 104, VDPA_106A, or VDPA 107A), and a session key 514A to use when communicating over the virtual communication channel with the adjacent node having VID 511A. The adjacency table for VDP 105B, shown in FIG. 5 as 510B, is similarly derived.

Each adjacency table, e.g. 510A, can also have context information, e.g., 505A for processing task(s) that may be executing within an adjacent VDP accelerator. Context information 505A can include, e.g., an identification of the node (host or VDP accelerator) that called the VDP accelerator, e.g. host 104 called VDP accelerator 105A. In table 510A, a process having a process_ID of host 104 is the caller of VDP accelerator 105A to perform work on behalf of host process "Host_104_ID: Process_ID." A caller status of Host_104_ID:Process_ID can be that the process is waiting on a result to be returned from VDP accelerator 105A. In adjacency table 510A, VDP accelerator 106A may have been called by VDP accelerator 105A to perform work that forms a sub-task of the processing task that VDP accelerator 105A is performing for a calling process Host_104_ID: Process_ID. The caller status of VDP accelerator 105A, with respect to called VDP accelerator 106A is that VDP accelerator 105A is waiting on results to be returned from VDP accelerator 106A before VDP accelerator 105A can return results to Host_104_ID:Process_ID. VDP accelerator 107A, which is adjacent to VDP accelerator 105A, may be idle and thus have no identified caller.

Session keys can be generated for each virtual communication channel 402 between two nodes (host 104 to VDP accelerator, or VDP accelerator to VDP accelerator). Generating session keys between two nodes is described above with reference to FIG. 3, and a method is described below with reference to FIG. 6. A session key of NULL indicates that the session key has not yet been determined between the two nodes referenced in the line item of the adjacency table having the NULL session key. When a DP accelerator receives, from host 104, an instruction and configuration information to configure VDP accelerators upon the DP accelerator, and to generate an adjacency table for each VDP accelerator, the session key field for each line item is initially set to NULL. When the session key is generated for the line item in the adjacency table, the NULL is replaced with the generated session key. When all session keys have been generated for all line items of adjacency tables in all VDP accelerators of a DP accelerator, then DP accelerator can send an indication to the host 104 that the DP accelerator and its respective VDP accelerators are ready to receive processing tasks. When all DP accelerators send such an indication to the host 104, then host 104 can use all configured VDP accelerators to perform processing tasks.

Figure 6:
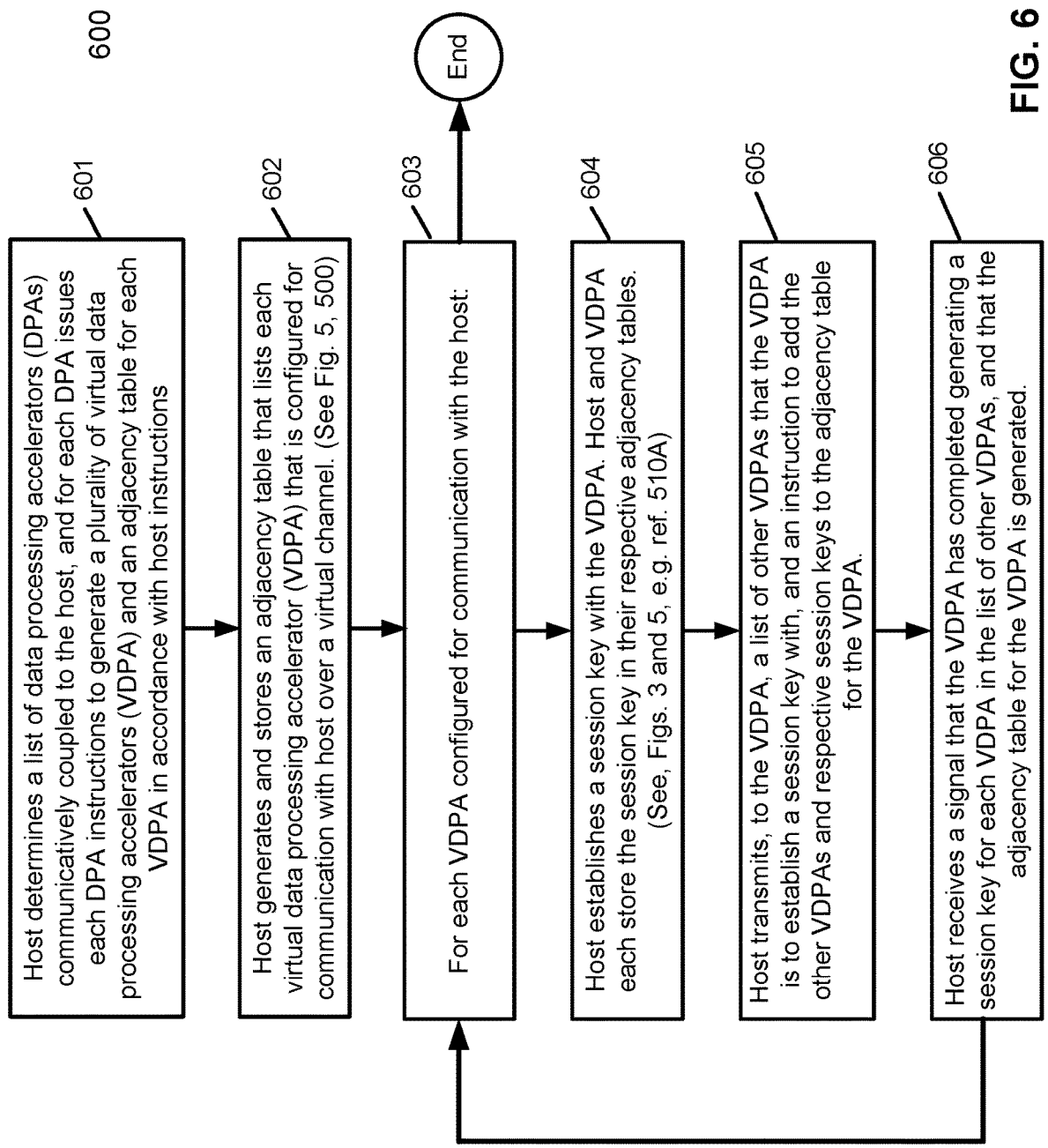
FIG. 6 is block diagrams illustrating a method 600 of a host device instructing a plurality of virtual data processing accelerators to configure themselves for secure communications, according to an embodiment.

FIG. 6 is block diagrams illustrating a method 600 of a host device instructing a plurality of virtual data processing accelerators to configure themselves for secure communications, according to an embodiment.

In operation 601, the host device determines a list of data processing accelerators (DPAs) that are communicatively coupled to communication ports of the host. The determination can be made from, e.g., an administrator's configuration file that lists the ports and DPA identifiers of the DPAs. In an embodiment, the host can send a query using each host communication port to determine one or more DPAs connected to each communication port of the host. The host can then send an instruction, and optionally configuration information, that instructs each DPA to configure itself to have a plurality of virtual data processing accelerators (VPDA) and to generate an adjacency table (e.g. FIG. 5, table 501A or 501B) for each VDPA in the DPA.

In operation 602, a host, e.g. host 104, generates and stores an adjacency table that lists each virtual data processing accelerator (VDPA) that is configured for communication over a virtual communication channel with the host. In an embodiment, one or more VDP accelerators can be configured by a system administrator using a configuration file. The configuration file can indicate which VDP accelerators can communicate with which other VDP accelerators. The configuration file can specify the unique identifier for the host and VDP accelerators, the specific communication port number to which each DP accelerator is assigned, and a virtual communication channel of the specific communication port for communicating with the VDP accelerator. There can be any number of VDP accelerators. For simplicity, one host, 104, and three DP accelerators, e.g. 105-107, are described, with each DP accelerator being configured for four VDP accelerators. The description of three DP accelerators each having four VDP accelerators is exemplary and non-limiting. A system can be configured with any number of hosts, and any number of DP accelerators, each DP accelerator being configured for any number of VDP accelerators. The generated adjacency table for the host can be similar to host table 500, described above with reference to FIG. 5.

In operation 603, logic in the host can iterate through the list of VDP accelerators configured for communication with the host, over virtual communication channels. For each VDP accelerator, operations 604 through 606 can be performed. If there are no more VDP accelerators in the list, then method 600 ends.

In operation 604, host selects a VDP accelerator from the list and generates a session key with the selected VDP accelerator. Generating a session key between a VDP accelerator and a host (Node) is described above with reference to FIG. 3. Host stores the generated session key in an entry in the adjacency table corresponding to the selected VDP accelerator. Host uses the administrator configuration file to complete the line item of entry in the adjacency table for the selected VDP accelerator, including the unique identifier of the VDP accelerator, the port number of the host for communicating with the DP accelerator, and virtual communications channel identifier, along with any relevant context information for the selected VDP accelerator, if any.

In operation 605, host transmits instructions to the selected VDP accelerator for the VDP accelerator to create its own adjacency table. The information in the host-transmitted instructions can be obtained from the administrator configuration file. The instructions include a list of other VDP accelerators that the selected VDP accelerator is to include when the selected VDP accelerator generates its own adjacency table. The instructions can further include a unique identifier of each of the other VDP accelerators, and a port number of the selected VDP accelerator to assign to each of the other VDP accelerators, a virtual communication channel identifier of a virtual communication channel that the VDP accelerator will use to communicate with one of the other VDP accelerators. The VDP accelerator stores the generated session key for each VDP accelerator in its own line item in the adjacency table, associated with the VDP identifier (e.g. VID 511A or VID 511B of FIG. 5) of the each VDP accelerator. The instructions further include an instruction that the selected VDP accelerator is to generate and store a session key with each of the other VDP accelerators in the adjacency table of the selected VDP accelerator. A method for a selected VDP accelerator to generate its own adjacency table is described below with reference to FIG. 7.

In operation 606, host receives a signal from the selected VDP accelerator that the selected VDP accelerator has generated its own adjacency table, populated the adjacency table with the information provided in operation 605, above, and has generated and stored a session key for each of the other VDP accelerators in the selected VDP accelerator's adjacency table. In an embodiment, a DP accelerator can monitor the completion of operations 603-605, and when operations 603-605 are complete for all VDP accelerators configured for a DP accelerator, then the DP accelerator can send a single message to the host that each of the VDP accelerators of the DP accelerator are configured and have session keys. Method 600 continues at operation 603.

Figure 7:
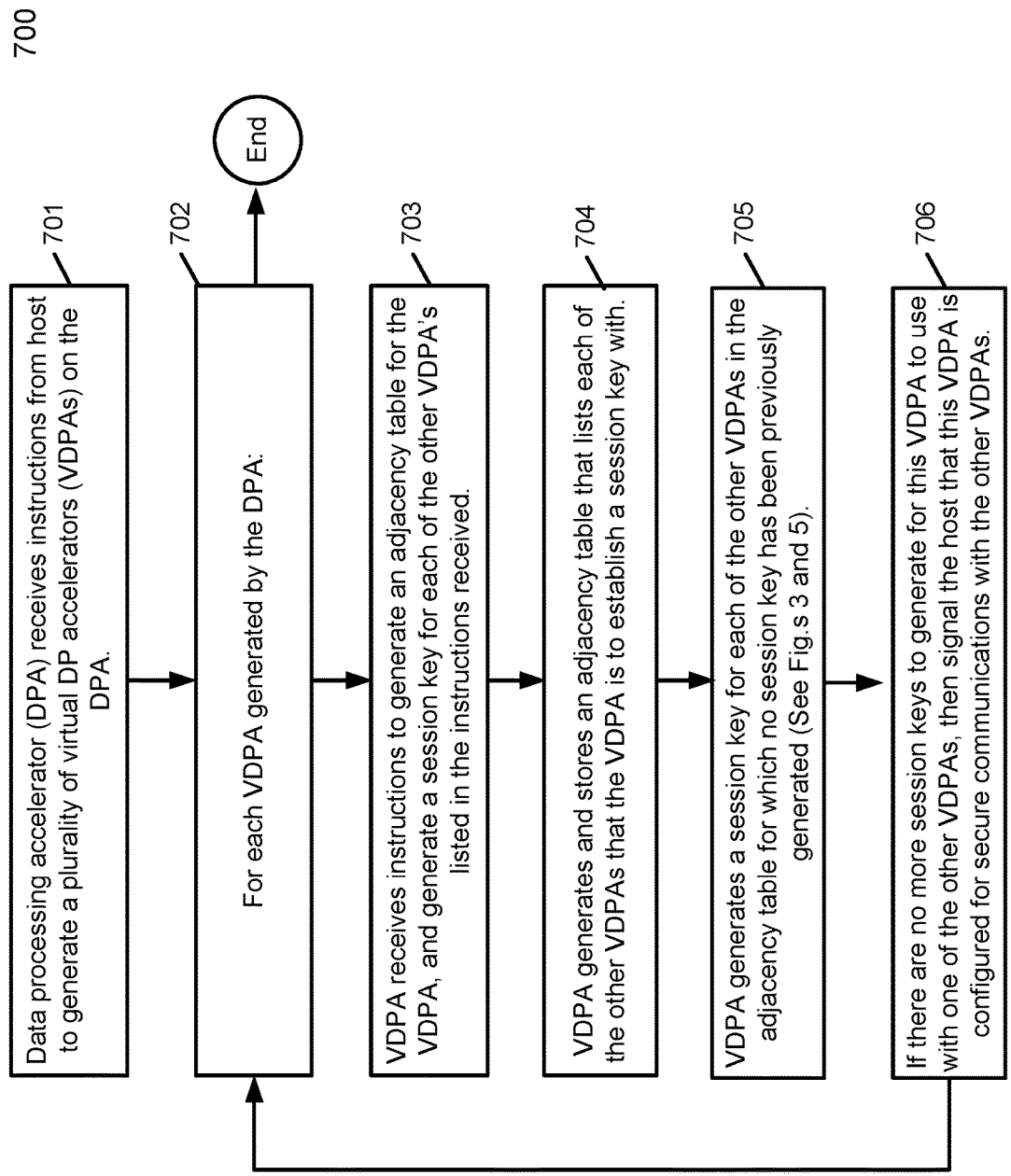
FIG. 7 is a block diagram illustrating a method of a virtual data processing accelerator configuring itself for secure communication with one or more other data processing accelerators, according to an embodiment.

FIG. 7 is a block diagram illustrating a method 700 of a virtual data processing accelerator configuring itself for secure communication with one or more other virtual data processing accelerators, according to an embodiment.

In operation 701, a DP accelerator receives instructions from a host device to generate a plurality of virtual DP accelerators (VDP accelerators) and to generate an adjacency table of communicatively connected nodes (host or VDP accelerators) for each of the generated VDP accelerators. Exemplary adjacency tables are described above with reference to FIG. 5. The information in the host-transmitted instructions can be obtained by the host from an administrator-created configuration file. In an embodiment, the instructions can be default instructions.

In operation 702, for each of the VDP accelerators generated by the DP accelerator, the VDP accelerator is selected and DP accelerator logic performs, or causes the selected VDP accelerator to perform, the following operations 703 through 706. When there are no more VDP accelerators to process, then method 700 ends.

In operation 703, the selected VDP accelerator receives instructions to generate an adjacency table for the selected VDP accelerator, the adjacency table listing a plurality of nodes (host or other VDP accelerators) that the selected VDP is communicatively coupled to via a virtual communication channel between the selected VDP accelerator and one of the plurality of nodes.

In operation 704, the VDP accelerator generates and stores and adjacency table for the selected VDP accelerator in accordance with the received instructions in operation 703. As described above, in FIG. 5, the adjacency table can include a line item entry for each of the other nodes (host or VDP accelerators) to which the selected VDP accelerator is communicatively coupled. Information for each line item entry can include a virtual device identifier (VID, e.g. FIG. 5, table 510A, VID 511A), a communication port of the selected DP accelerator corresponding to a physical port, e.g. 512A of FIG. 5, of the DP accelerator that is hosting the selected VDP accelerator, a virtual communication channel identifier, e.g. 513A of FIG. 5, and a session key field for storing a session key generated for communication between the selected VDP accelerator one of the other nodes.

In operation 705, the selected VDP accelerator generates a session key for each of the other nodes (host or VDP accelerators) that are configured for communication with the selected VDP accelerator. The session key is stored in a line item entry of the adjacency table of the selected VDP accelerator, the line item entry associated with the node. The selected VDP accelerator generates a different session key between the selected VDP accelerator and each of the other adjacent nodes (host or VDP accelerator) to the selected VDP accelerator. The session key is for use in communicating between the selected VDP accelerator and one of the other nodes. Generating a session key between a VDP accelerator and a node (host or VDP accelerator) is described above with reference to FIG. 3. VDP accelerator logic stores the session key in its adjacency table for the selected VDP accelerator, in association with the selected VDP accelerator.

In operation 706, if there are no more VDP accelerators to be configured for the DP accelerator, and thus there are no more session keys to generate for the VDP accelerators of the DP accelerator, then the DP accelerator transmits a message or signal to the host that the DP accelerator has finished configuring VDP accelerators and generating adjacency tables for the VDP accelerators and session keys for secure communication with each of the other VDP accelerators in the adjacency tables. In an embodiment, each session key in the adjacency table is different than other session keys in the adjacency table. In an embodiment, each configured VDP accelerator of the DP accelerator separately notifies the host 104 that the VDP accelerator has been configured and a session key generated for the VDP accelerator. In an embodiment, each configured VDP accelerator notifies the DP accelerator which is hosting the VDP accelerator, that the VDP accelerator is configured and a session key has been generated for the VDP accelerator. Then the DP accelerator notifies the host 104 when all VDP accelerators of the selected DP accelerator are configured and a session key is generated. Method 700 continues at operation 702.

Figure 8:
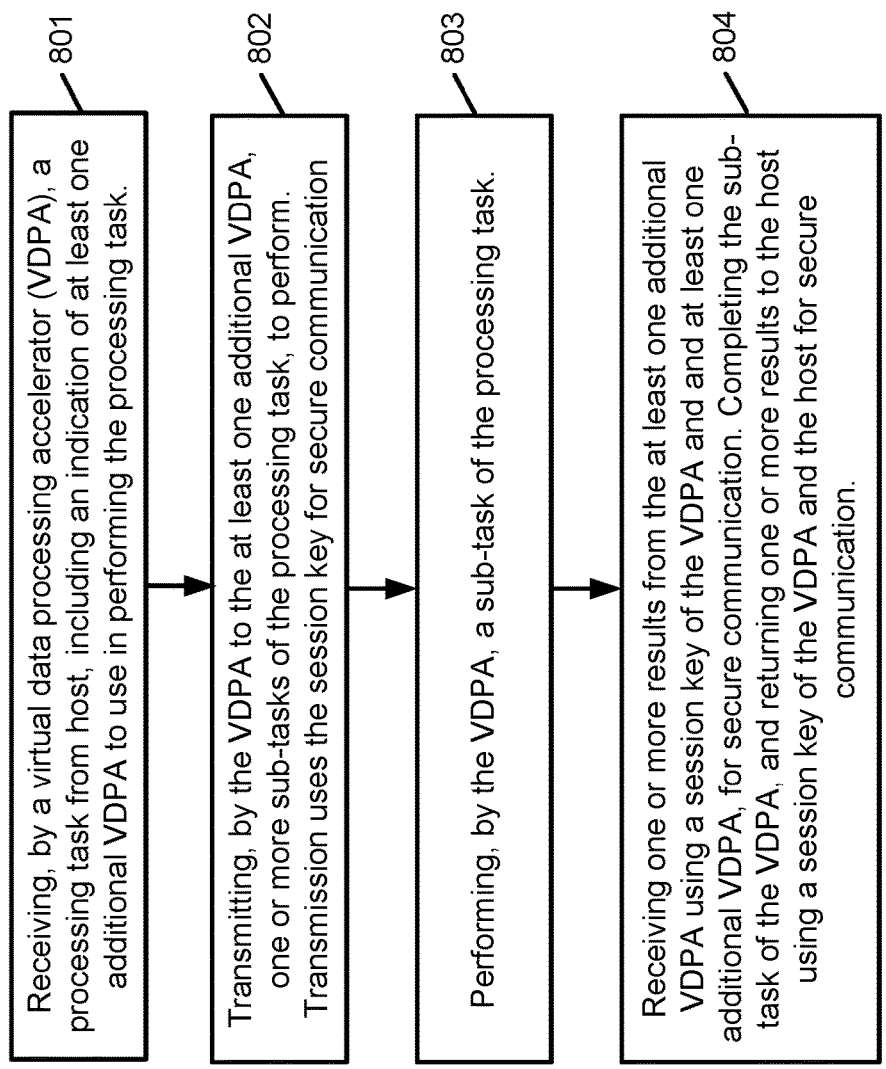
FIG. 8 is block diagram illustrating a method of a virtual data processing accelerator receiving a processing task from a host and performing one or more sub-tasks of the tasks by one or more additional virtual data processing accelerators, according to an embodiment.

FIG. 8 is block diagram illustrating a method 800 of a virtual data processing (VDP) accelerator receiving a processing task from a host and performing one or more sub-tasks of the tasks by one or more additional VDP accelerators, according to an embodiment.

In operation 801, a VDP accelerator receives a processing task from a host device. In an embodiment, the processing task includes instructions on dividing the processing task into sub-tasks that are to be processed on at least on additional VDP accelerator, and the VDP accelerator has an entry in the adjacency table of the VDP accelerator for securely communicating with the at least one additional VDP accelerator. In this embodiment, it is assumed that host determined that the at least one additional VDP accelerator is, or soon will be, idle such that the at least one additional VDP accelerator can perform one or more sub-tasks on behalf of the VDP accelerator.

In operation 802, the VDP accelerator transmits one or more sub-tasks to the at least one additional VDP accelerator with instructions to perform the sub-task(s). A message transmitting the one or more sub-tasks is secured using a session key generated for use between the VDP accelerator and the at least one additional VDP accelerator. The at least one additional VDP accelerator performs the one or more sub-tasks.

In operation 803, the VDP accelerator also performs one or more sub-tasks of the received processing task.

In operation 804, the VDP accelerator receives one or more results from the at least one additional VDP accelerator. The VDP accelerator completes its one or more sub-tasks of the processing tasks, and returns, to the host, one or more results from the one or more sub-tasks perform by the VDP accelerator and the one or more sub-tasks performed by the at least one additional DP accelerator. Method 800 ends.

The peer-to-peer communication between DPAs can be extended to broadcast a message from the host to a select number of DPAs (or subset of DPAs or designated DPAs) using a broadcast protocol through a communication chain between the DPAs or via a communication switch (such as a PCIe switch) coupled to the DPAs. Broadcast can be used where the host is required to communicate a message to a number of DPAs. A broadcast communication occurs when an application of the host schedules a job to be processed by a subset of DPAs (or designated DPAs) and the application is required to send the same information (e.g., input data or model) to the subset of DPAs. The broadcast protocol is required to be secure (i.e., only the subset of DPAs can read the broadcast message) yet robust (e.g., having a session-based encryption scheme).

Furthermore, when multiple applications/users request a broadcast, a host server can cause the DPAs to spawn one or more virtual DPAs (VDPAs) for each respective DPA, each VDPA utilizing a portion of the resources of the DPA to service one or more applications. The virtualization of the DPAs can be managed by a virtualization module (e.g., virtualization module 282 of FIG. 2) of the DPA to provide a sandbox environment for the one or more applications. In one embodiment, the host server maintains a mapping table of the VDPAs mapped to one or more applications so communication data for a respective application is routed by the host server to the mapped VDPAs. When the application terminates, the VDPAs can be released. Adjacent VDPAs can communicate with each other so long they are spawned for the same one or more applications.

For example, referring to FIG. 4, a first application of host 104 may request a broadcast to DPAs 105-107, the request to cause host 104 to spawn a first set of virtual DPAs (105A, 106A, and 107A) with virtual communication channels 402A that has the same port and configuration as that of the physical communication channel 401 for DPAs 105-107. A second application of host 104 may request a broadcast to DPAs 105-107, the request to cause host 104 to spawn a second set of virtual DPAs (105B, 106B, and 107B). A third application of host 104 may request a broadcast to DPAs 105-107, the request to cause host 104 to spawn a third set of virtual DPAs (105C, 106C, and 107C). A fourth application of host 104 may request a broadcast to DPAs 105-106, the request to cause host 104 to spawn a fourth set of virtual DPAs (105D, 106D, and 107D), and so forth. Each set has respective virtual communication channels 402B-D that has the same port and configuration as that of the physical communication channel 401 for the set of VDPAs.

Figure 9:
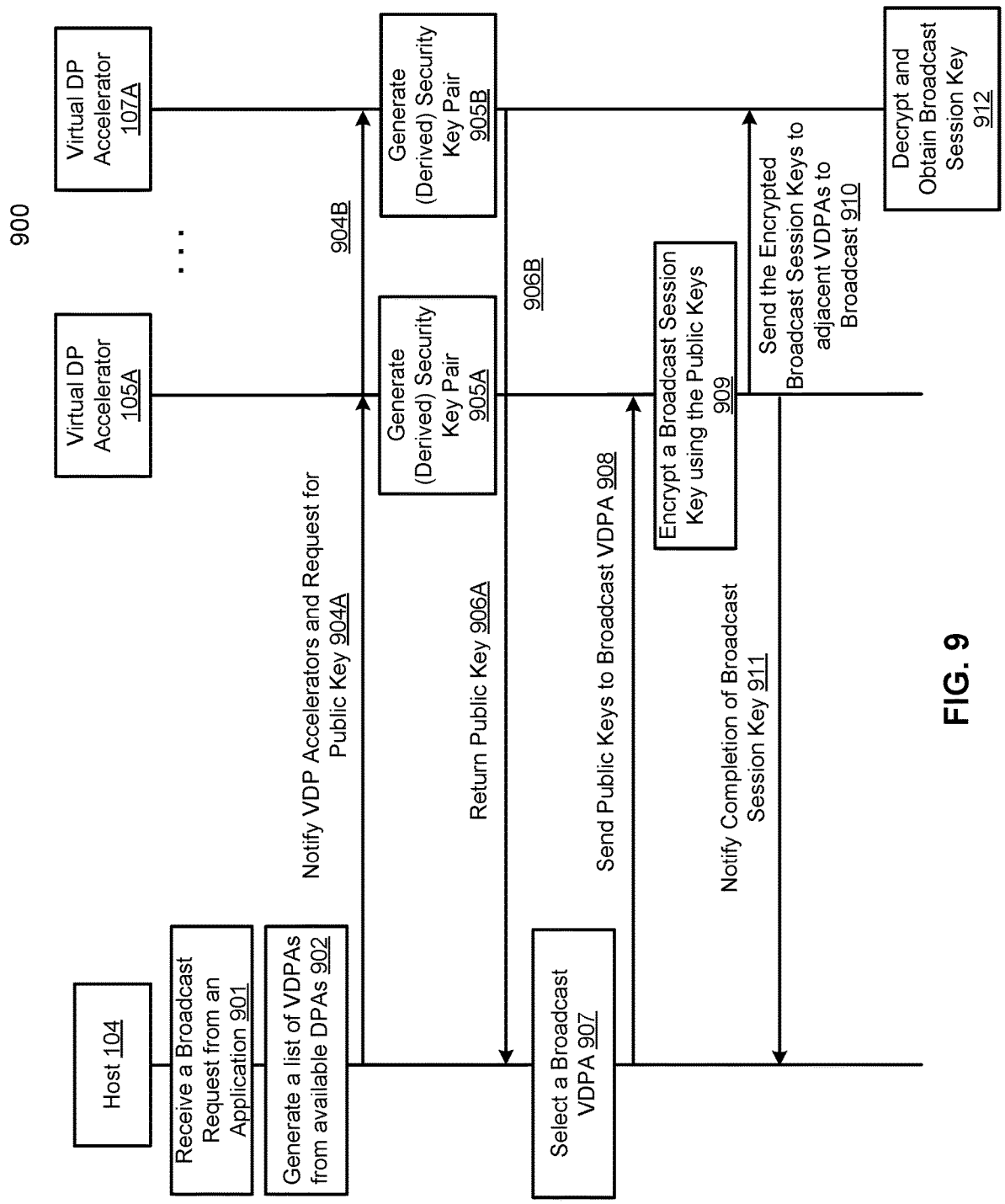
FIG. 9 is a flow chart illustrating a broadcast protocol of a host and one or more virtual data processing accelerators according to an embodiment.

FIG. 9 is a flow chart illustrating a broadcast protocol of a host and one or more virtual data processing accelerators according to an embodiment. A broadcast communication refers to a communication of data from a host or DPA or VDPA to many listeners (e.g., many DPAs or VDPAs) (e.g., one-to-many relationship), instead of a one-to-one relationship. The receiving VDPAs can include many VDPAs, including VDPAs in communication with one or more hosts or a subset of VDPAs associated with one host in communication with a requesting application requesting the broadcast. Referring to FIG. 9, method 900 can be performed by host 104 and one or more VDPAs 105-107 communicatively coupled to host 104, where the VDPAs are coupled to each other in a chain configuration as illustrated in FIG. 4.

In one embodiment, at block 901, host 104 receives a broadcast request from an application of host 104 to broadcast to the subset of DPAs 105-107. The broadcast request can be a request to broadcast an identical, or repeatable message to a subset of DPAs in communication with host 104. The broadcast request can identify the subset of DPAs by DPA identifiers as part of a list of DPAs coupled to host 104. At block 902, host 104 generates a list of VDPAs based on the DPAs coupled to host 104 and generates a mapping table mapping the application to the generated list of VDPAs. Host 104 can send a request to the DPAs to cause the DPAs to spawn the VPDAs based on the mapping table. In one embodiment, the mapping table specifies the virtual communication channels (e.g., channels 402) and ports associated with the VDPAs, where the VDPAs is to utilize a portion of data processing resources of the respective DPAs. Essentially, the VDPAs would function like the DPAs but in virtual sandboxes providing data processing resources to many user applications or environments (each with their own set of virtualized DPAs and communication channels).

Once the VPAs are spawned (e.g., 105A, 106A, and 107A are spawned for an application in this example), at block 904, host 104 sends requests to the subset of VDPAs for a public key associated with the VDPAs. The public key can be part of a security key pair derived by a root key of a security unit for each of the VDPAs. At block 905, the VDPAs generate derived security key pairs, where the derived private keys of the pairs are kept local to the VDPAs, and the derived public keys of the pairs are sent to host 104, at block 906.

At block 907, host 104 selects a broadcast VDPA. In one embodiment, the broadcast VDPA can be selected based on an average of the shortest distances to each of the subset of VDPAs from the broadcast VDPA to minimize a broadcast latency. In another embodiment, the broadcast VDPA can be selected based on a currently scheduled computational load, or available computation capacity of the VDPAs compared with the rest of the VDPAs. In another embodiment, the VDPAs can be randomly selected based on a random number generator. For this example, the broadcast VDPA selected is VDPA 105A for the purpose of illustration. At block 908, host 104 sends the public keys to the broadcast VDPA 105A, and optionally, generates and sends a broadcast session key to the broadcast VDPA 105A, where the broadcast session key is a symmetric key used for encrypting and decrypting of the broadcast communication session. In another embodiment, the broadcast session key is generated locally by broadcast VDPA 105A and the broadcast session key is sent by broadcast VDPA 105A to host 104. In one embodiment, the broadcast session key can be a randomly generated session key.

At block 909, upon receiving the public keys (and optionally the broadcast session key), VDPA 105A encrypts the broadcast session key with each of the public keys to generate a set of messages for propagation. In another embodiment, block 909 can be performed by host 104, e.g., host 104 encrypt the broadcast session key with each of the public keys to generate a set of messages and host 104 sends the set of messages to VDPA 105A for propagation.

At block 910, broadcast VDPA 105A broadcasts the encrypted broadcast session key to the VDPAs through virtual channels coupled to any of its ports (here, as illustrated in FIG. 4, VDPA 106A is coupled at port 1 of VDPA 105A, and VDPA 107A is coupled at port 2 of VDPA 105A). Broadcast VDPA 105A sends the encrypted broadcast session key to VDPA 106A at port 1 and VDPA 107A at port 2. In one embodiment, the broadcast message includes a message header that specifies a propagation instruction for the VDPAs receiving the broadcast message to propagate or repeat the broadcast to VDPAs coupled to their respective ports, and an instruction to terminate a propagation when any VDPA receives the broadcast message twice. Referring to FIG. 4, for example, upon receiving the broadcast at port 1 by VDPA 106A, VDPA 106A sends or propagates a first message to a VDPA coupled at port 2 of VDPA 106A, e.g., sends the broadcast message to VDPA 107A via port 1 of VDPA 107A. Because VDPA 107A received the message twice, (from VDPA 105A and VDPA 106A), this first message propagation terminates at VDPA 107A. Similarly, upon receiving the broadcast at port 2 by VDPA 107V (because VDPA 105A sends the broadcast to VDPA 107A at port 2), VDPA 107A sends or propagates a second propagation message to a VDPA coupled at port 1 of VDPA 107A, e.g., sends the broadcast message to VDPA 106A via port 2 of VDPA 106A. Here, because VDPA 106A received the message twice (from VDPA 105A and VDPA 107A), this second message propagation terminates at VDPA 106A. At block 911, upon dispatch of the propagation messages, VDPA 105A notifies host 104 that the broadcast session key is delivered to the VDPAs. At block 912, each of the subset of VDPAs receiving the encrypted broadcast session key decrypts and obtains the broadcast session key using a private key of the VDPA.

Thereafter, data to be broadcasted by the requesting application can be encrypted by host 104 based on a broadcast session key and data can be sent from host 104 to broadcast VDPA 105A for propagation, or broadcast VDPA 105A encrypts the data based on the broadcast session key for propagation. Upon receiving the broadcast data, the subset of VDPAs with the broadcast session key can decrypt and obtain the broadcast data.

In another embodiment, VDPA 105A broadcasts the encrypted broadcast session key to a VDPA coupled to only one of its ports, the broadcast includes a propagation instruction for the VDPAs receiving the broadcast message to propagate the broadcast to VDPAs coupled to their respective ports, and an instruction to terminate the propagation when the broadcast VDPA 105A receives the original broadcast message. In this case, the broadcast message would traverse in a circular manner. For example, the broadcast can traverse clockwise, e.g., VDPA 105A->VDPA 107A->VDPA 106A->VDPA 105A, in which case, VDPA 105A receives the original broadcast and terminates the propagation. The broadcast can traverse counter clockwise, e.g., VDPA 105A->VDPA 106A->VDPA 107A->VDPA 105A, in which case, VDPA 105A receives the original broadcast and terminates the propagation. When each of the VDPAs receive the broadcast, the subset of VDPAs participating in the broadcast can decrypt and obtain the broadcast session key based on a private key associated with the VDPA. Thereafter, broadcast data received by any of the subset of VDPAs can decrypt the broadcast using the broadcast session key. In some embodiments, any communication (or broadcasts) between adjacent VADPs discussed above can be further encrypted using adjacent session keys based on the adjacency tables of FIG. 5.

Figure 10:
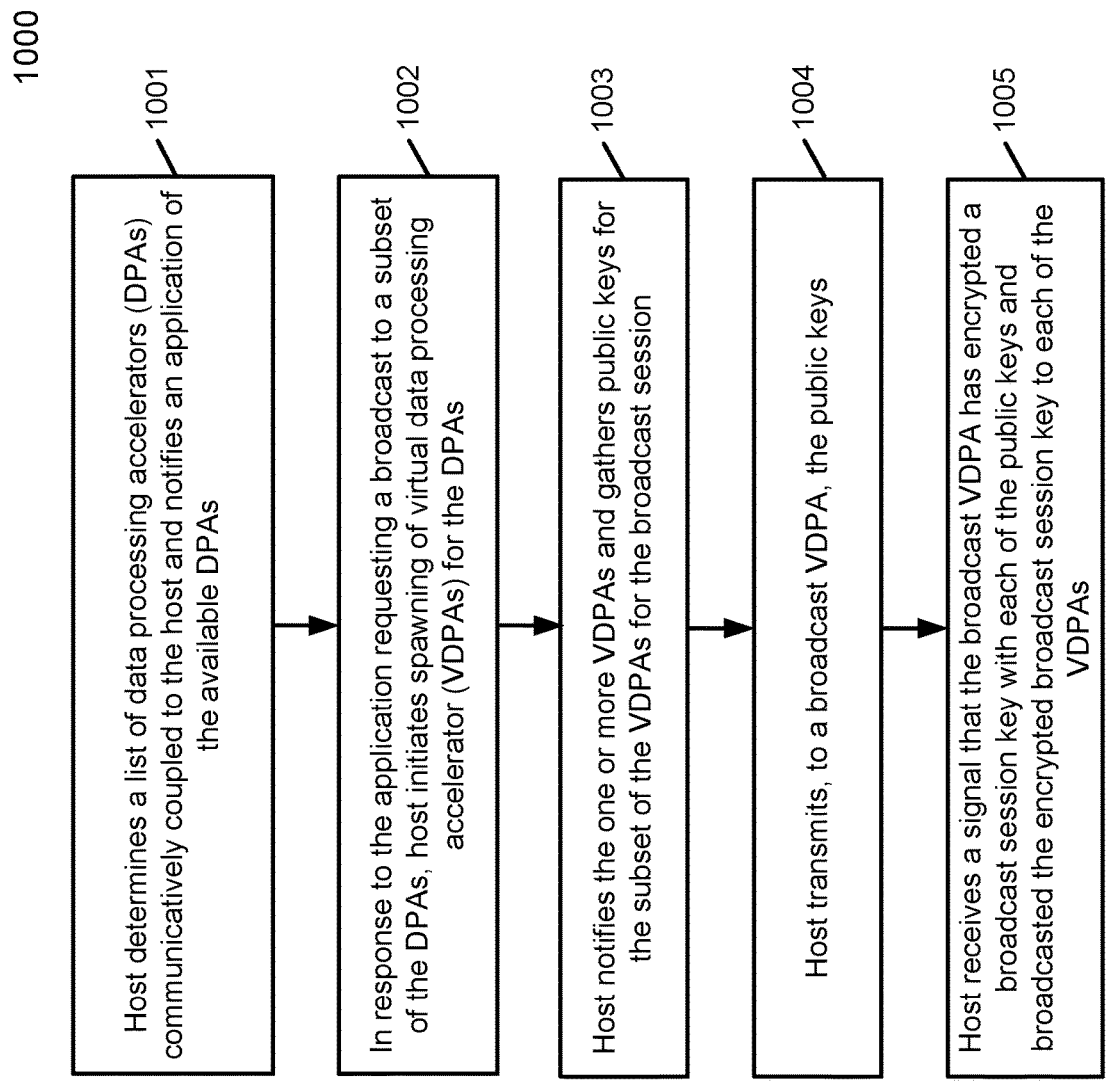
FIG. 10 is a flow diagrams illustrating an example method for a host to perform a broadcast according to an embodiment.

FIG. 10 is a flow diagrams illustrating an example method for a host to perform a broadcast according to an embodiment. Process 1000 may be performed by processing logic which may include software, hardware, or a combination thereof. For example, process 1000 may be performed by host system, such as host 104 of FIG. 4 or FIG. 9. Referring to FIG. 10, at block 1001, processing logic determines a list of data processing accelerators (DPAs) communicatively coupled to the host and notifies an application of the available DPAs. At block 1002, in response to an application requesting to broadcast to a subset of the DPAs, processing logic initiates spawning of VDPAs for the DPAs. At block 1003, processing logic notifies the VDPAs and gathers public keys for the subset of the VDPAs. At block 1004, processing logic transmits the public keys to a broadcast VPDA. Here, the broadcast VPDA can be selected based on an average of nearest distances of the broadcast VDPA to the rest of the VDPAs or based on availability of computational capacity of the DPAs, or based on a random selection, etc. At block 1004, processing logic receives a signal indicating that the broadcast VDPA has encrypted a broadcast session key using the public keys for the subset of VDPAs to generate a set of encrypted broadcast session key and broadcasted the set of encrypted broadcast session keys to each of the one or more VDPAs via message propagation, where only the subset of VDPAs can decrypt and obtain the broadcast session key. In another embodiment, host 104 encrypts the broadcast session key using the public keys for the subset of VDPAs and sends the encrypted to the broadcast VDPA for propagation.

Figure 11:
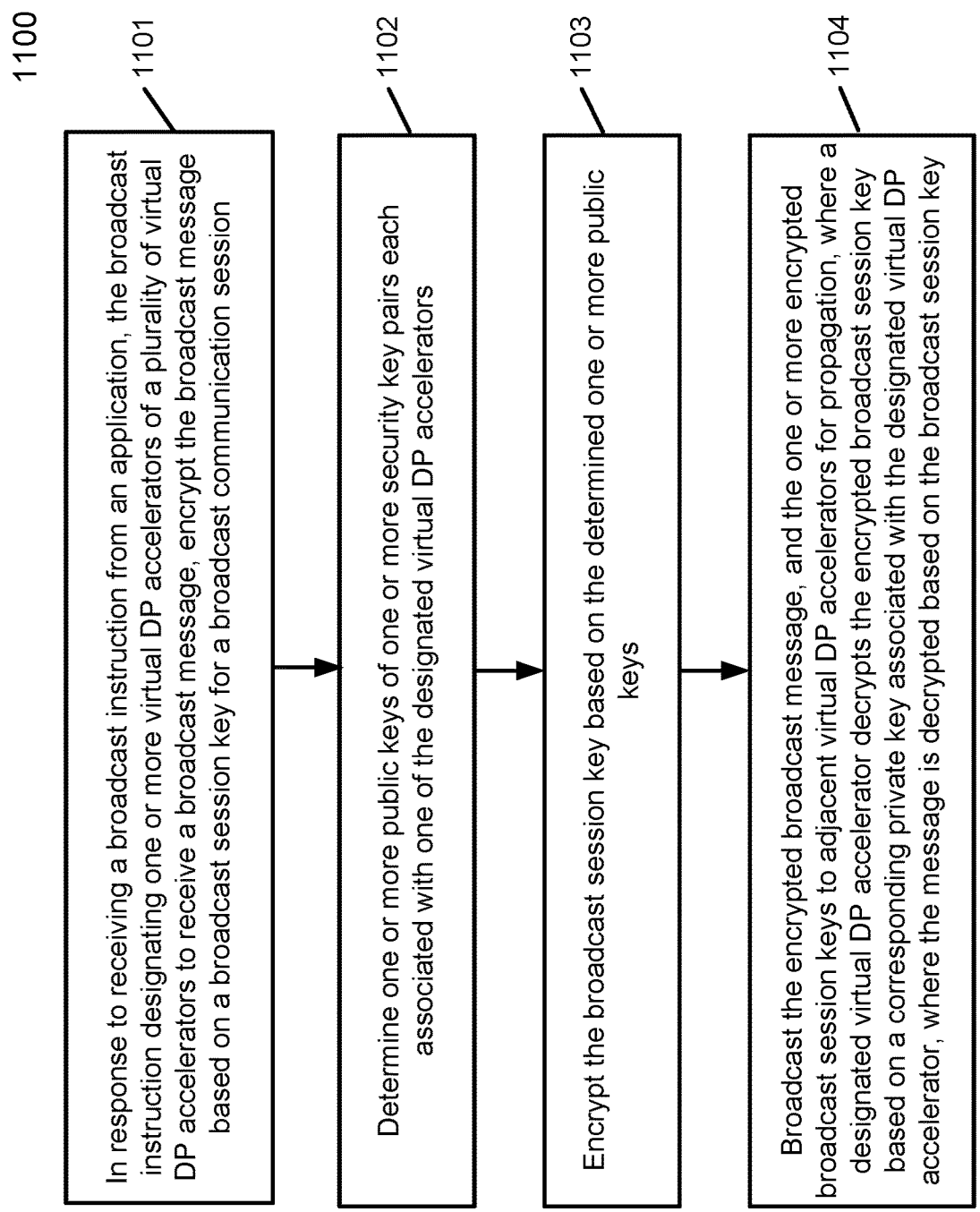
FIG. 11 is a flow diagrams illustrating an example method for a virtual data processing accelerator to perform a broadcast according to an embodiment.

FIG. 11 is a flow diagrams illustrating an example method for a virtual data processing accelerator to perform a broadcast according to an embodiment. Process 1100 may be performed by processing logic which may include software, hardware, or a combination thereof. For example, process 1100 may be performed by a VDPA, such as VDPA 105A of FIG. 4 or FIG. 9. Referring to FIG. 11, at block 1101, in response to receiving a broadcast instruction from an application, the broadcast instruction designating one or more virtual DP accelerators of a plurality of virtual DP accelerators to receive a broadcast message, processing logic encrypts the broadcast message based on a broadcast session key for a broadcast communication session. At block 1102, processing logic determines one or more public keys of one or more security key pairs each associated with one of the designated virtual DP accelerators. At block 1103, processing logic encrypts the broadcast session key based on the determined one or more public keys. At block 1104, processing logic broadcasts the encrypted broadcast message, and the one or more encrypted broadcast session keys to adjacent virtual DP accelerators for propagation, where a designated virtual DP accelerator decrypts the encrypted broadcast session key based on a corresponding private key associated with the designated virtual DP accelerator, where the message is decrypted based on the broadcast session key.

In one embodiment, the virtual DP accelerator receiving the broadcast instruction from the application is designated as a broadcast virtual DP accelerator to broadcast a message. In one embodiment, the adjacent virtual DP accelerators propagates the broadcast by receiving the broadcast and forwarding the broadcast to their adjacent virtual DP accelerators.

In one embodiment, the broadcast propagation terminates if the designated virtual DP accelerator receives the propagation broadcast. In one embodiment, the broadcasted message for propagation includes a message source, a message context, but no message destination.

In one embodiment, a non-designated virtual DP accelerator of the plurality of virtual DP accelerators receives the broadcast but does not have a corresponding key to decrypt the encrypted broadcast for generation of the broadcast session key and the non-designated virtual DP accelerator has no access to the broadcast session key to decrypt the broadcast message for the communication session. In one embodiment, the broadcast message is communicated via a virtual communication channel associated with a virtual DP accelerator.

With respect to any of the above aspects, a host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
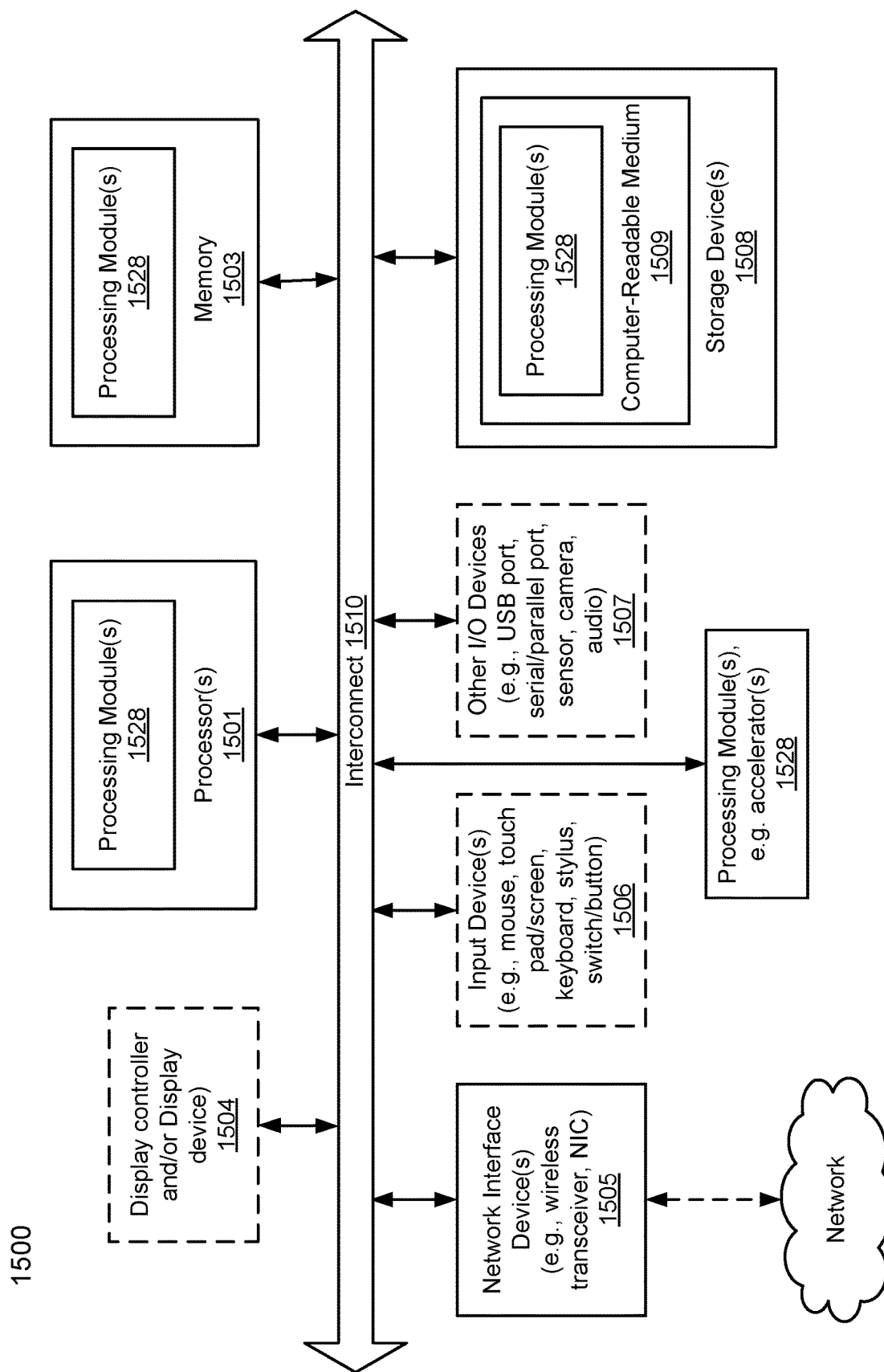
FIG. 12 is a block diagram illustrating a data processing system according to one embodiment.

FIG. 12 is a block diagram illustrating an example of a data processing system which may be used with one embodiment of the invention. For example, system 1500 may represent any of data processing systems described above performing any of the processes or methods described above, such as, for example, a client device or a server described above, such as, for example, host 104 or DPAs 105-107 or VDPAs 105A-107D, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104 or DPAs 105-107 of FIG. 4. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to broadcast a message to one or more virtual data processing (DP) accelerators, the method comprising:
   in response to receiving a broadcast instruction from an application, the broadcast instruction designating one or more virtual DP accelerators of a plurality of virtual DP accelerators to receive a broadcast message, encrypting the broadcast message based on a broadcast session key for a broadcast communication session;
   determining one or more public keys of one or more security key pairs each associated with one of the designated virtual DP accelerators;

encrypting the broadcast session key based on the determined one or more public keys; and broadcasting the encrypted broadcast message, and the one or more encrypted broadcast session keys to adjacent virtual DP accelerators for propagation, wherein a designated virtual DP accelerator decrypts the encrypted broadcast session key based on a corresponding private key associated with the designated virtual DP accelerator, wherein the message is decrypted based on the broadcast session key and the message is communicated via a virtual communication channel associated with the virtual DP accelerator based on an adjacent table that includes the broadcast session key.

2. The method of claim 1, wherein the virtual DP accelerator receiving the broadcast message is designated as a broadcast virtual DP accelerator to broadcast a message.

3. The method of claim 1, wherein the adjacent virtual DP accelerators propogate the broadcast by receiving the broadcast and forwarding the broadcast to their adjacent virtual DP accelerators.

4. The method of claim 1, wherein the broadcast propagation terminates if the designated virtual DP accelerator receives the propagation broadcast.

5. The method of claim 1, wherein the broadcasted message for propagation includes a message source, a message context, but no message destination.

6. The method of claim 1, wherein a non-designated virtual DP accelerator of the plurality of virtual DP accelerators receives the broadcast but does not have a corresponding key to decrypt the broadcast message for generation of the broadcast session key and the non-designated virtual DP accelerator has no access to the broadcast session key to decrypt the broadcast message for the communication session.

7. The method of claim 1, further comprising: generating the adjacency table, wherein the adjacency table comprises an endpoint virtual identifier, a physical port identifier of a port of a DP accelerator that hosts a virtual DP accelerator, a virtual channel identifier, or context information.

8. The method of claim 7, wherein the context information includes an identifier of a node or a process identifier that called the virtual DP accelerator.

9. The method of claim 1, wherein the broadcast session key is one of a plurality of broadcast session key, wherein each broadcast session key corresponds to a different virtual channel.

10. A non-transitory machine-readable medium having instructions stored therein, which when executed by a processor, cause the processor to perform one or more operations, the operations comprising:

in response to receiving a broadcast instruction from an application, the broadcast instruction designating one or more virtual data processing (DP) accelerators of a plurality of virtual DP accelerators to receive a broadcast message, encrypting the broadcast message based on a broadcast session key for the broadcast message;

determining one or more public keys of one or more security key pairs each associated with one of the designated virtual DP accelerators;

encrypting the broadcast session key based on the determined one or more public keys; and broadcasting the encrypted broadcast message, and one or more encrypted broadcast session keys to adjacent virtual DP accelerators for propagation, wherein a designated virtual DP accelerator decrypts the encrypted broadcast session key based on a corresponding private key associated with the designated virtual DP accelerator, wherein the message is decrypted based on the broadcast session key and the message is communicated via a virtual communication channel associated with the virtual DP accelerator based on an adjacent table that includes the broadcast session key.

11. The non-transitory machine-readable medium of claim 10, wherein the virtual DP accelerator receiving the broadcast message is designated as a broadcast virtual DP accelerator to broadcast a message.

12. The non-transitory machine-readable medium of claim 10, wherein the adjacent virtual DP accelerators propagate the broadcast message by receiving the broadcast and forwarding the broadcast to their adjacent virtual DP accelerators.

13. The non-transitory machine-readable medium of claim 10, wherein the broadcast propagation terminates if the designated virtual DP accelerator receives the propagation broadcast.

14. The non-transitory machine-readable medium of claim 10, wherein the broadcasted message for propagation includes a message source, a message context, but no message destination.

15. The non-transitory machine-readable medium of claim 10, wherein a non-designated virtual DP accelerator of the plurality of virtual DP accelerators receives the broadcast message but does not have a corresponding key to decrypt the broadcast message for generation of the broadcast session key and the non-designated virtual DP accelerator has no access to the broadcast session key to decrypt the broadcast message for the communication session.

16. A data processing system, comprising:
a processor; and
a memory coupled to the processor to store instructions, which when executed by the processor, cause the processor to perform operations, the operations including:

in response to receiving a broadcast instruction from an application, the broadcast instruction designating one or more virtual data processing (DP) accelerators of a plurality of virtual DP accelerators to receive a broadcast message, encrypting the broadcast message based on a broadcast session key for the broadcast message;

determining one or more public keys of one or more security key pairs each associated with one of the designated virtual DP accelerators;

encrypting the broadcast session key based on the determined one or more public keys; and broadcasting the encrypted broadcast message, and one or more encrypted broadcast session keys to adjacent virtual DP accelerators for propagation, wherein a designated virtual DP accelerator decrypts the encrypted broadcast session key based on a corresponding private key associated with the designated virtual DP accelerator, wherein the message is decrypted based on the broadcast session key and the message is communicated via a virtual communication channel associated with the virtual DP accelerator based on an adjacent table that includes the broadcast session key.

17. The system of claim 16, wherein the virtual DP accelerator receiving the broadcast message is designated as a broadcast virtual DP accelerator to broadcast a message.

18. The system of claim 16, wherein the adjacent virtual DP accelerators propagate the broadcast message by receiving the broadcast message and forwarding the broadcast message to their adjacent virtual DP accelerators.

19. The system of claim 16, wherein the broadcast propagation terminates if the designated virtual DP accelerator receives the propagation broadcast.

20. The system of claim 16, wherein the broadcast message for propagation includes a message source, a message context, but no message destination.

21. The system of claim 16, wherein a non-designated virtual DP accelerator of the plurality of virtual DP accelerators receives the broadcast message but does not have a corresponding key to decrypt the broadcast message for generation of the broadcast session key and the non-designated virtual DP accelerator has no access to the broadcast session key to decrypt the broadcast message for the communication session.

\* \* \* \* \*